United States Patent
Hatfield et al.

(10) Patent No.: US 12,140,995 B1
(45) Date of Patent: Nov. 12, 2024

(54) HEAD-MOUNTED DISPLAY WITH CHANGEABLE CENTER OF GRAVITY

(71) Applicant: APPLE INC., Cupertino, CA (US)

(72) Inventors: Dustin A. Hatfield, Los Gatos, CA (US); Daniel M. Strongwater, San Francisco, CA (US); Kristi E. Bauerly, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/239,466

(22) Filed: Aug. 29, 2023

Related U.S. Application Data

(63) Continuation of application No. 16/742,118, filed on Jan. 14, 2020, now Pat. No. 11,782,480.

(60) Provisional application No. 62/793,458, filed on Jan. 17, 2019.

(51) Int. Cl.
*G02B 27/01* (2006.01)
*G06F 1/16* (2006.01)
*G06F 3/01* (2006.01)

(52) U.S. Cl.
CPC ......... *G06F 1/163* (2013.01); *G02B 27/0176* (2013.01); *G02B 27/0179* (2013.01); *G06F 3/012* (2013.01)

(58) Field of Classification Search
CPC . G02B 27/0176; G02B 27/0179; G06F 1/163; G06F 3/012
See application file for complete search history.

(56) References Cited

U.S. PATENT DOCUMENTS

| | | | |
|---|---|---|---|
| 5,822,127 | A | 10/1998 | Chen et al. |
| 5,844,530 | A | 12/1998 | Tosaki |
| 5,954,642 | A | 9/1999 | Johnson et al. |
| 6,421,031 | B1 | 7/2002 | Ronzani et al. |
| 6,520,182 | B1 | 2/2003 | Gunaratnam |
| 6,596,161 | B2 | 7/2003 | Kerfoot |
| 7,216,647 | B2 | 5/2007 | Lang et al. |
| 8,482,488 | B2 | 7/2013 | Jannard |
| 8,576,276 | B2 | 11/2013 | Bar-Zeev et al. |
| 8,605,008 | B1 | 12/2013 | Prest et al. |
| 8,661,662 | B1 | 3/2014 | Cok |
| 8,814,691 | B2 | 8/2014 | Haddick et al. |
| 9,274,340 | B2 | 3/2016 | Lyons |

(Continued)

FOREIGN PATENT DOCUMENTS

WO 201519625 A1 2/2015

OTHER PUBLICATIONS fixit.com, "PlayStation VR Teardown", Published Oct. 13, 2016, Downloaded Jul. 15, 2017, https://www.ifixit.com/Teardown/PlayStation+VR+Teardown/69341, 18 pp.

(Continued)

*Primary Examiner* — Roy P Rabindranath

(74) *Attorney, Agent, or Firm* — Young Basile Hanlon & MacFarlane, P.C.

(57) ABSTRACT

A head-mounted display includes a display unit, a head support, and a balancing mass. The display unit displays graphical content to a user. The head support is coupled to the display to support the display unit on a head of the user for displaying the graphical content thereto. The balancing mass is movable relative to the display unit to offset changes in torque induced by the display unit when tilting the head-mounted display.

20 Claims, 9 Drawing Sheets

(56) References Cited

U.S. PATENT DOCUMENTS

| | | | |
|---|---|---|---|
| 9,836,663 | B2 | 12/2017 | Yun et al. |
| 9,851,267 | B1 | 12/2017 | Ma et al. |
| 2012/0075169 | A1 | 3/2012 | Iba et al. |
| 2014/0159995 | A1 | 6/2014 | Adams et al. |
| 2014/0272915 | A1* | 9/2014 | Higashino ............. G06F 1/1688 |
| | | | 434/365 |
| 2015/0219901 | A1 | 8/2015 | Morimoto |
| 2016/0036151 | A1 | 2/2016 | Tominaga et al. |
| 2016/0044981 | A1 | 2/2016 | Frank et al. |
| 2016/0054571 | A1 | 2/2016 | Tazbaz et al. |
| 2016/0077547 | A1 | 3/2016 | Aimone et al. |
| 2017/0261388 | A1 | 9/2017 | Ma et al. |
| 2017/0277254 | A1 | 9/2017 | Osman |
| 2017/0365101 | A1 | 12/2017 | Samec et al. |
| 2018/0014906 | A1 | 1/2018 | Fukushima et al. |
| 2018/0046147 | A1 | 2/2018 | Aghara et al. |
| 2021/0231259 | A1 | 7/2021 | Ma et al. |

OTHER PUBLICATIONS fixit.com, "Oculus Rift CV1 Teardown", Published Mar. 30, 2016, Downloaded Jul. 15, 2017, https://www.ifixit.com/Teardown/Oculus+ Rift+CV1+Teardown/60612#s126787, 18 pp.

fixit.com, "HTC Vive Teardown", Published Apr. 26, 2016, Downloaded Jul. 15, 2017, https://www.ifixit.com/Teardown/HTC+Vive+ Teardown/62213#s130812, 22 pp.

fixit.com, "Razer OSVR HDK 2 Teardown", Published Aug. 10, 2016, Downloaded Jul. 15, 2017, https://www.fixit.com/Teardown/ Razer+OSVR+HDK+2+Teardown/65804, 15 pp.

* cited by examiner

HEAD-MOUNTED DISPLAY WITH CHANGEABLE CENTER OF GRAVITY

CROSS-REFERENCE TO RELATED APPLICATION(S)

This application is a continuation of United States Patent Application No. 16/742,118, filed on Jan. 14, 2020, and claims priority to and the benefit of U.S. Provisional Application No. 62/793,458, filed on Jan. 17, 2019. The content of the foregoing applications are incorporated herein by reference in their entirety for all purposes.

TECHNICAL FIELD

This disclosure relates to display systems and, in particular, head-mounted displays.

BACKGROUND

A head-mounted display is a device that is worn on a head of a user for displaying graphical content thereto. When worn on the head of the user and in an upright position, a center of gravity of the head-mounted display is typically arranged forward of and above a head-neck pivot joint about which a head pivots relative to a neck of the user. As a result of the center of mass being arranged forward of the head-neck pivot joint, the head-mounted display induces a forward torque thereabout. Furthermore, when the user tilts their head forward, as a result of the center of mass of the head-mounted display being arranged above the head-neck pivot joint, a moment arm of the center of mass moves further away from the head-neck pivot joint. Thus, forward tilting of the head may increase the forward torque induced by the head-mounted display. In order to stabilize the head, the user must exercise neck muscles, which may be uncomfortable and/or induce fatigue, especially when the head-mounted display is worn for long periods of time.

SUMMARY

Disclosed herein are implementations of head-mounted displays and methods related thereto.

In an implementation, a head-mounted display includes a display unit, a head support, and a balancing mass. The display unit displays graphical content to a user. The head support is coupled to the display to support the display unit on a head of the user for displaying the graphical content thereto. The balancing mass is movable relative to the display unit to offset changes in torque induced by the display unit when tilting the head-mounted display.

The balancing mass may be moved in response to tilting about a pitch axis formed by a head-neck pivot joint of the user. In an upright position, the balancing mass may be positioned rearward of the head-neck pivot joint and the display unit forward of the head-neck pivot joint. In a forward tilted position that is tilted forward from the upright position about the head-neck pivot joint, the balancing mass may be positioned rearward of the head-neck pivot joint and the display unit forward of the head-neck pivot joint. As the head-mounted display is tilted forward, the balancing mass may be moved away from the display unit to remain positioned rearward of the head-neck pivot joint.

In an implementation, a head-mounted display includes a static mass and a moving mass. The static mass includes a display unit for displaying graphical content to a user and a head support coupled to the display unit for supporting the display unit on a head of the user. The static mass has a static mass center of gravity that remains generally fixed relative to the head of the user when worn thereon. The moving mass is movable relative to the static mass. The moving mass has a moving mass center of gravity that is movable relative to the head of the user. The moving mass is movable in response to movement of the head-mounted display about a pivot joint to shift a center of gravity of the head-mounted display to offset changes in torque about the pivot joint induced by the static mass center of gravity moving relative to the pivot joint.

In an upright position, the moving mass center of gravity may be rearward of the pivot joint, and the static mass center of gravity forward of the pivot joint. In a forward position, the moving mass center of gravity may be rearward of the pivot joint, and the static mass center of gravity forward of the pivot joint. As the head-mounted display is tilted forward about the pivot joint from the upright position to the forward position, the moving mass center of gravity may be moved from a first location away from the static mass center of gravity to a second location. The first location may be forward of the pivot joint in the forward position. The moving mass may include a balancing mass and another balancing mass that may be moved in cooperation to shift the moving mass center of gravity rearward of the static mass center of gravity. The static mass further may further include a movement sensor that senses movement of the head-mounted display, and the moving mass is moved in response to the movement sensed by the movement sensor to shift the moving mass center of gravity to offset changes in torque induced by the static mass from the movement.

In an implementation, a method for operating a head-mounted display includes sensing, with a sensor, tilting of the head-mounted display, and shifting, with an actuator, a center of gravity of the head-mounted display relative to itself according to the sensing. The head-mounted display being configured to be worn on a head of a user and display graphical content to thereto.

DETAILED DESCRIPTION

Disclosed herein are embodiments of head-mounted displays, which include one or more balancing masses that are movable to shift a center of gravity of the head-mounted display. For example, as the head-mounted display is tilted (e.g., moved) forward about a pivot joint, the balancing mass is moved rearward relative to other components and, thereby, shift rearward the center of gravity of the head-mounted display. By shifting the center of gravity of the head-mounted display, torque induced by the head-mounted display may be reduced, thereby lessening neck torque that might otherwise be required to stabilize the head-mounted display.

Figure 1:
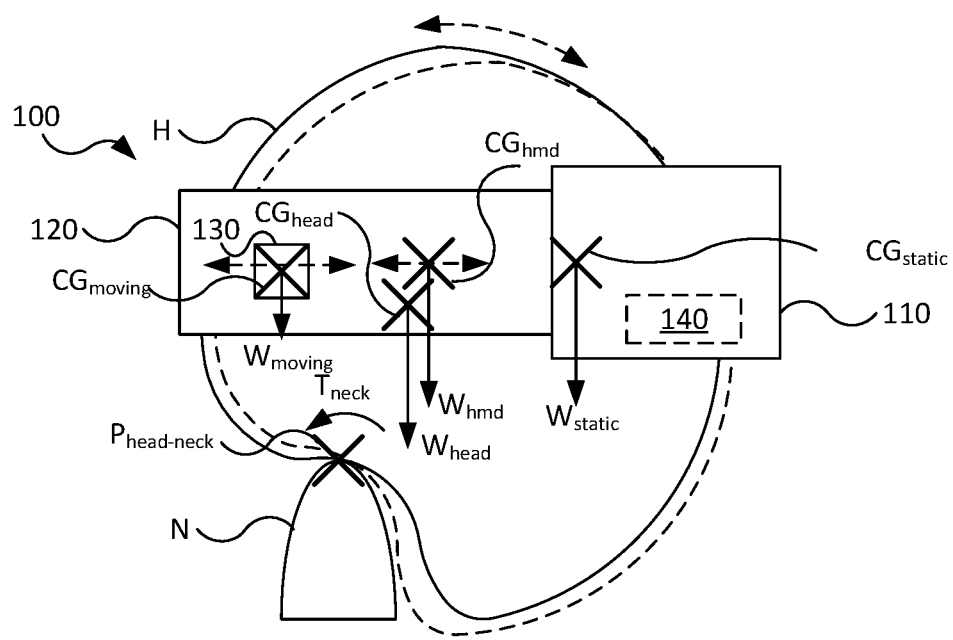
FIG. 1 is a side view of a head-mounted display on a head of a user, the head being shown in an upright position (solid lines) and in a tilted position (dashed lines).
Figure 2A:
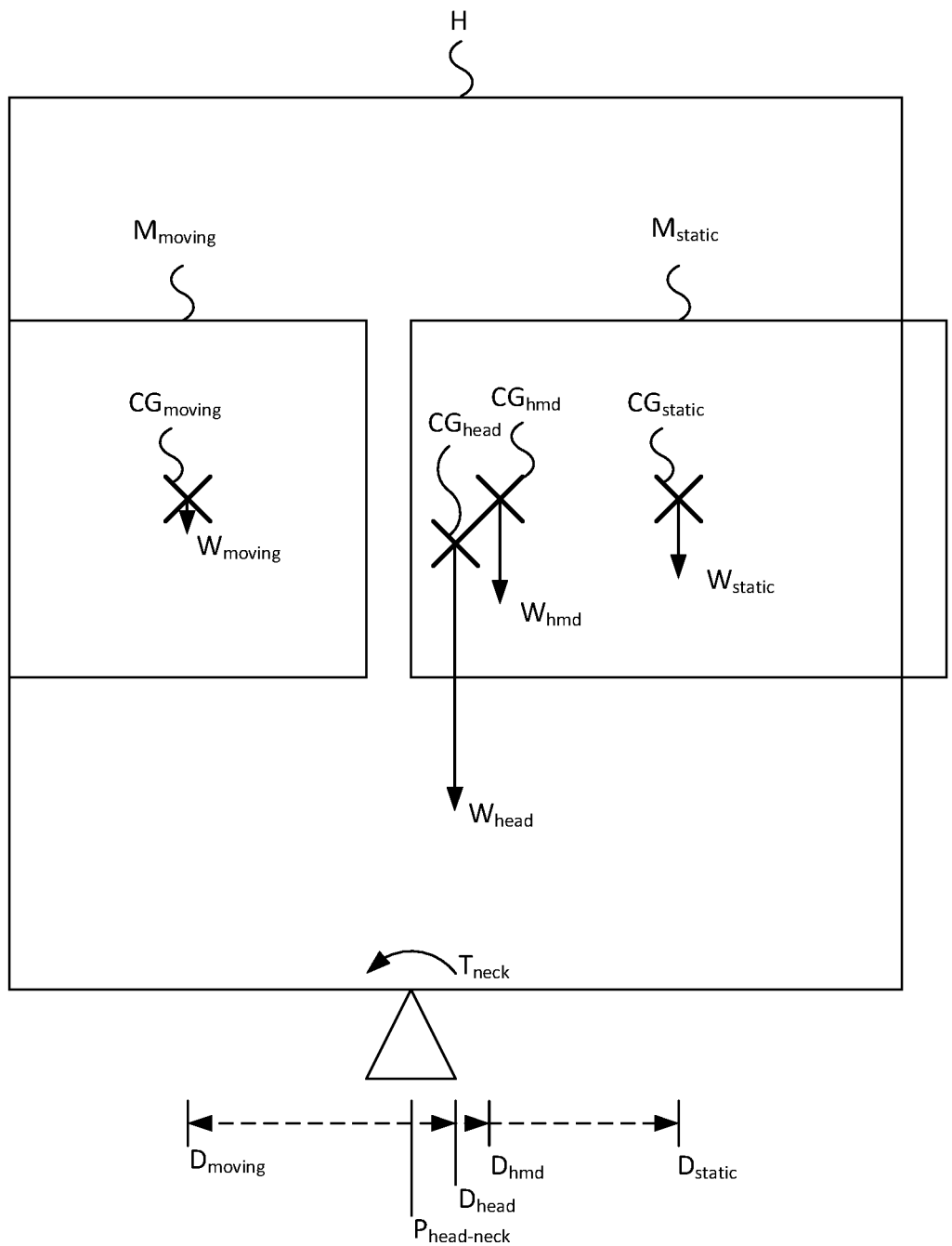
FIG. 2A is a schematic side view of the head-mounted display of FIG. 1 on the head of the user in the upright position and in a first configuration.
Figure 2B:
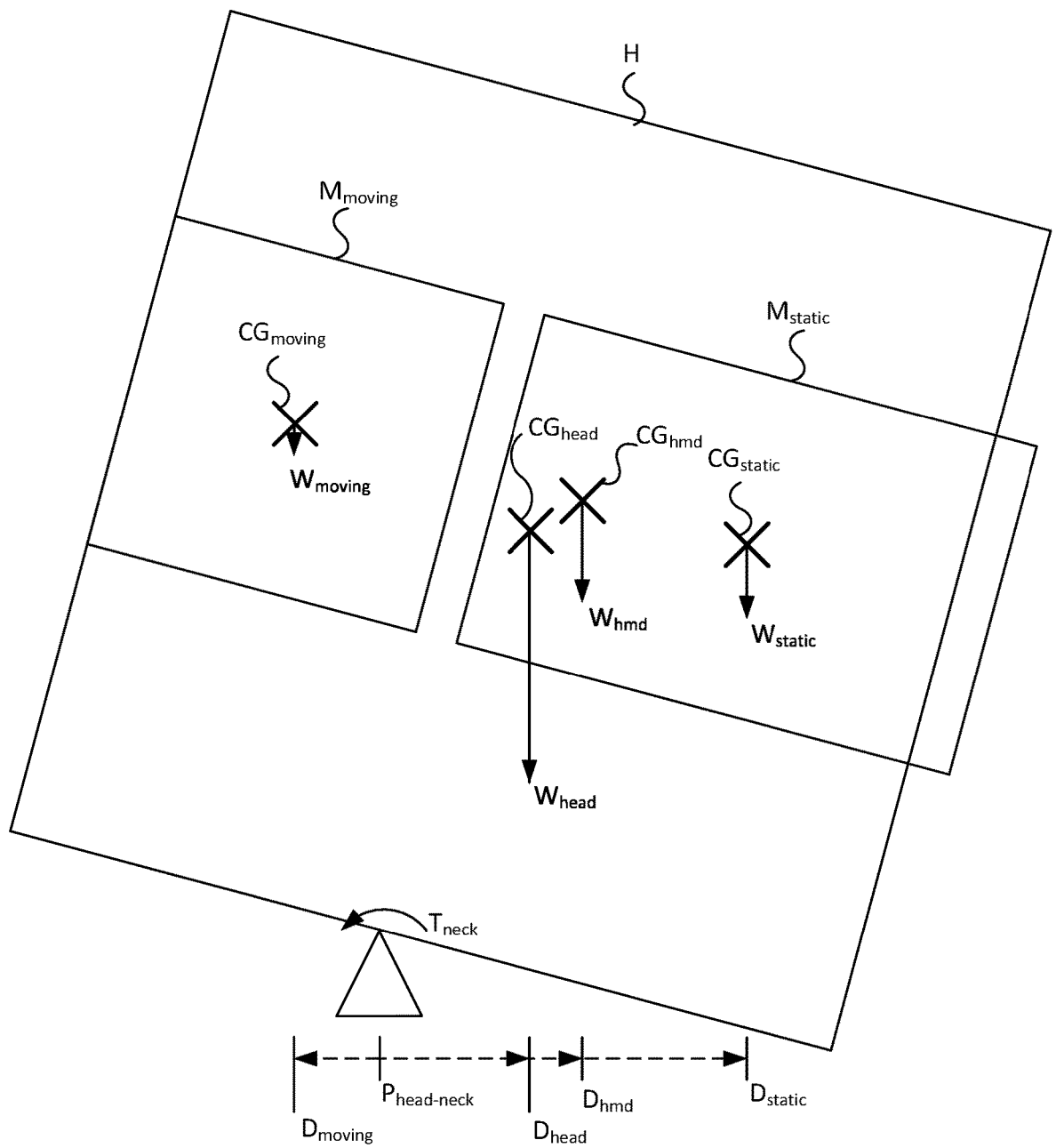
FIG. 2B is a schematic side view of the head-mounted display of FIG. 1 on the head of the user in the tilted position and in the first configuration.
Figure 2C:
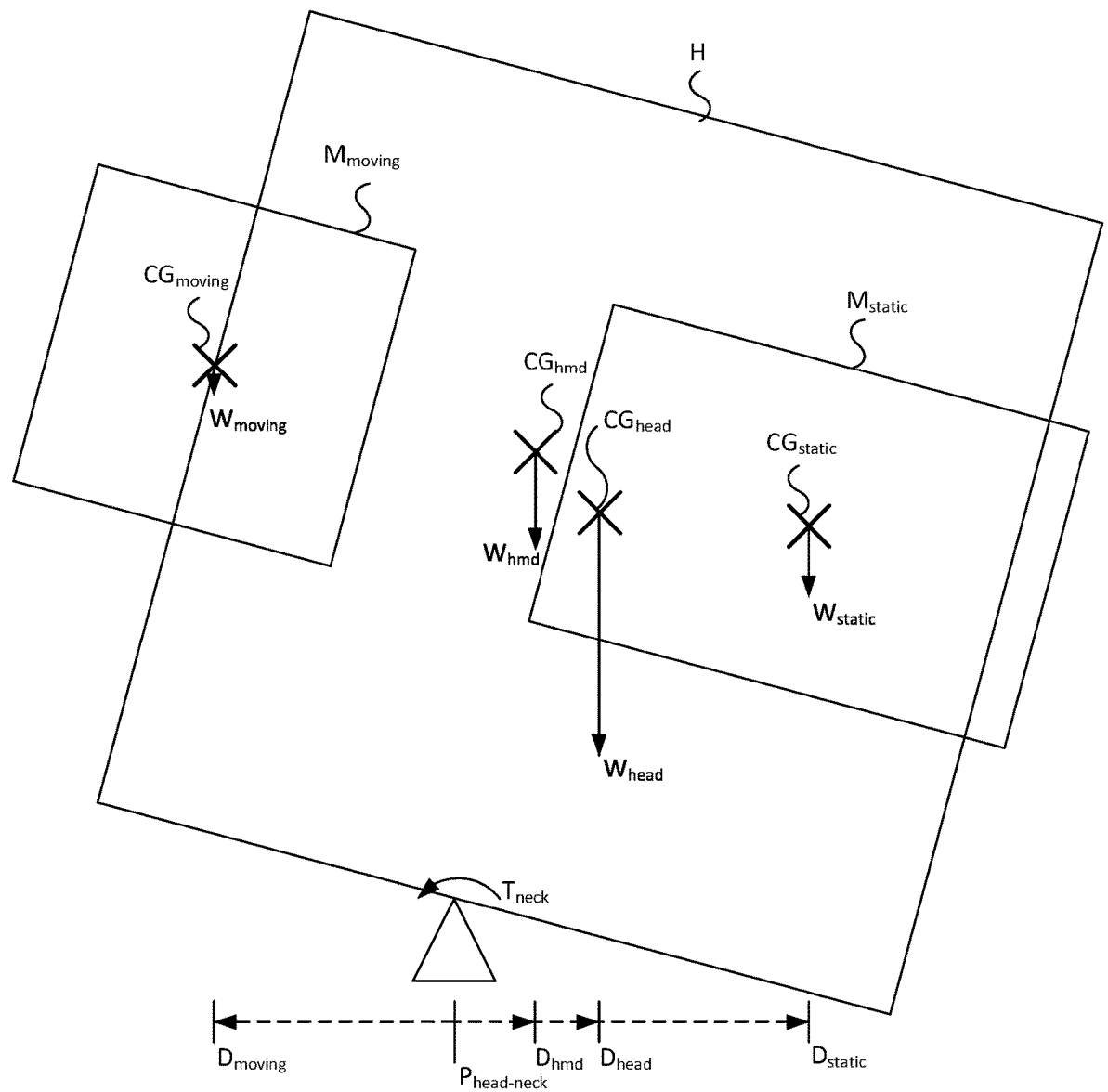
FIG. 2C is a schematic side of the head-mounted display of FIG. 1 on the head of the user in the titled position and in a second configuration.

Referring to FIG. 1, a head-mounted display 100 is wearable on a head H of a user for displaying graphical content thereto, such as of a computer-generated reality (discussed below). The head-mounted display 100 generally includes a display unit 110, a head support 120, one or more balance masses 130, and electronics 140. With further reference to FIGS. 2A-2C, those components of the head-mounted display 100 that remain substantially stationary relative to the head H of the user when thereon may be cooperatively referred to as a static mass $M_{static}$. These stationary components may include the display unit 110, the head support 120, and the electronics 140, or portions thereof. Those components of the head-mounted display 100 that move relative to the head H of the user when worn thereon may be cooperatively referred to as a moving mass $M_{moving}$. These moving components generally include the one or more balance masses 130. As discussed in further detail below, the moving mass $M_{moving}$ (i.e., the movable components, such as the balance masses 130) is movable relative to the static mass $M_{static}$ (i.e., the static components, such as the display unit 10, the head support 120, and the electronics 140) to shift a center of gravity of the head-mounted display 100.

The display unit 110 is configured to display the graphical content to the user and may include one or more display screens (e.g., one display screen provided for each eye of the user; not shown). In a non-limiting example, the display unit 110 may have a weight of approximately one to one and a half pounds, more, or less.

The head support 120 is coupled to the display unit 110 and is configured to support the display unit 110 on the head H of the user in suitable position for displaying the graphical content thereto. The head support 120 may, as is illustrated, be configured as a band that extends around the head H of the user, or may be configured in other manners (e.g., extending partially around the head H of the user, or over top the head H of the user). In a non-limiting example, the head support 120 may have a small mass as compared to the display unit 110.

The balance mass 130 is movable relative to the display unit 110 to shift the center of gravity of the head-mounted display 100. For example, the balance mass 130 is moved in response to (e.g., is movable in response to) tilting of the head H, the head-mounted display 100, and/or the display unit 110. Variations of the balance mass 130 are discussed in further detail below.

The electronics 140 may include various electronic components, such as one or more of controllers, processors, memory, sensors, and communications interfaces, for operation of the head-mounted display 100. The electronics 140 are discussed in further detail below.

Figure 2D:
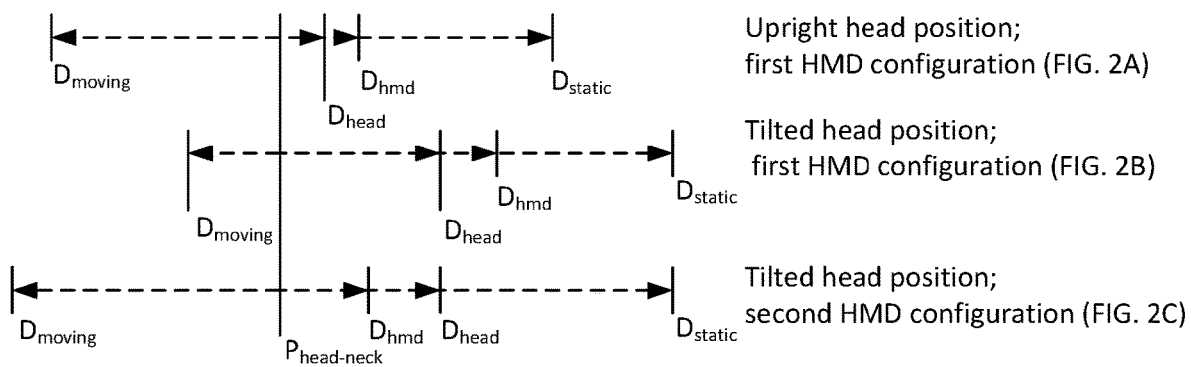
FIG. 2D is a plot of moment arms of the head, the head-mounted display, a static mass of the head-mounted display, and a moving mass of the head-mounted display from FIGS. 2A-2C.

Still referring to FIGS. 1-2C and additionally to FIG. 2D, the head H of the user and the head-mounted display 100 generate torque about a head-neck pivot joint $P_{head-neck}$ (e.g., the atlanto-occipital joint). The torque generated by the head-mounted display 100 must be overcome by a neck torque $T_{neck}$ output by muscles the neck N of the user to stabilize the head H of the user. As the user moves the head H, the torque induced by the head H and the head-mounted display 100 vary.

FIGS. 1 and 2A illustrate the head H in an upright position and the head-mounted display 100 in a first configuration. The upright position may be a position at which the user might normally hold the head H, such as the natural head position defined herein as an upright position with eyes looking straight ahead at a distant mark at eye level. The first configuration includes the moving mass $M_{moving}$ (i.e., formed by the balance masses 130) being arranged at a first location relative to the static mass $M_{static}$ (i.e., formed by at least the display unit 110), such as with a first distance therebetween. The upright position may also be referred to as an upright head position, an upright HMD position, an upright display unit position, a horizontal position, or a level position.

FIG. 2B illustrates the head H in a tilted position with the head-mounted display 100 remaining in the first configuration. The tilted position is tilted (e.g., moved) relative to the upright position about the head-neck pivot joint $P_{head-neck}$, for example, 15 degrees forward as shown. The tilted position may also be referred to as a tilted head position, a tilted HMD position, or a tilted display unit position.

FIG. 2C illustrates the head H in the tilted position with the head-mounted display 100 in a second configuration. The second configuration includes the moving mass $M_{moving}$ being a ranged at a second location relative to the static mass $M_{static}$, such as with a second distance therebetween (e.g., a larger distance, as shown).

Still referring to FIGS. 2A-2D, the head H and the head-mounted display 100 have mass and center of gravity properties that induce torque about the head-neck pivot joint $P_{head-neck}$, against which the neck N outputs a neck torque $T_{neck}$ to stabilize the head H. The head H has a head center of gravity $CG_{head}$, a head weight $W_{head}$, and a head moment arm $D_{head}$ that is the horizontal component of the head center of gravity $CG_{head}$ measured from the head-neck pivot joint $P_{head-neck}$. In a non-limiting example and for illustrative purposes, the head weight $W_{head}$ may be 10 pounds, and the head center of gravity $CG_{head}$ may be 0.5 inches forward of and five inches above the head-neck pivot joint $P_{head-neck}$ when in the upright position.

In the upright position, the head H induces a forward torque about the neck N of the user (see FIGS. 1 and 2A), which increases as the user tilts the head H forward. In particular, since the head center of gravity $CG_{head}$ is above and forward of the head-neck pivot joint $P_{head-neck}$ in the upright position, forward tilting moves the head center of gravity $CG_{head}$ further forward of the head-neck pivot joint $P_{head-neck}$ to increase the head moment arm $D_{head}$ and, thereby, increase forward torque (compare FIGS. 2B and 2C to FIG. 2A; see also FIG. 2D).

The head-mounted display unit 100 has an HMD center of gravity $CG_{hmd}$, an HMD weight $W_{hmd}$, and an HMD moment arm $D_{hmd}$ that is the horizontal component of the HMD center of gravity $CG_{hmd}$ measured from the head-neck pivot joint $P_{head-neck}$. The HMD center of gravity $CG_{hmd}$, the HMD weight $W_{hmd}$, and the HMD moment arm $D_{hmd}$ result from those components that form the head-mounted display 100, which include the static mass $M_{static}$ and the moving mass $M_{moving}$.

The static mass $M_{static}$ has a static mass center of gravity $CG_{static}$, a static mass weight $W_{static}$, and a static mass moment arm $D_{static}$ that is the horizontal component of the static mass center of gravity $CG_{static}$ measured from the head-neck pivot joint $P_{head-neck}$. In a non-limiting example and for illustrative purposes, the static mass weight $W_{static}$ may be 1.5 pounds, and the static mass center of gravity $CG_{static}$ may be located 3 inches forward of and 5.5 inches above the head-neck pivot joint $P_{head-neck}$ in the upright position.

In the upright position, the static mass $M_{static}$ of the head-mounted display 100 induces a forward torque about the head-neck pivot joint $P_{head-neck}$ (see FIGS. 1 and 2A), which increases as the user tilts the head H forward. In particular, since the static mass center of gravity $CG_{static}$ is above and forward of the head-neck pivot joint $P_{head-neck}$ in the upright position, forward tilting moves the static mass center of gravity $CG_{static}$ further forward of the head-neck pivot joint $P_{head-neck}$ to increase the static mass moment arm $D_{static}$ and, thereby, increase forward torque (compare FIGS. 2B and 2C to FIG. 2A; see also FIG. 2D).

The moving mass $M_{moving}$ has a moving mass center of gravity $CG_{moving}$, a moving mass weight $W_{moving}$, and a moving mass moment arm $D_{moving}$ that is the horizontal component of the moving mass center of gravity $CG_{moving}$. In a non-limiting example and for illustrative purposes, the moving mass weight $W_{moving}$ may be 1 pound, and the moving mass center of gravity $CG_{moving}$ may be located 2.5 inches rearward of and 5.5 inches above the head-neck pivot joint $P_{head-neck}$ when in the upright position and the first configuration.

In the upright position and the first configuration, the moving mass $M_{moving}$ of the head-mounted display 100 induces a rearward torque (e.g., a negative forward torque) about the head-neck pivot joint $P_{head-neck}$ (see FIGS. 1 and 2A). If the moving mass $M_{moving}$ were to remain in the first configuration as the head H is tilted forward, the rearward torque would decrease. In particular, since the moving mass center of gravity $CG_{smoving}$ would be above and rearward of the head-neck pivot joint $P_{head-neck}$ in the upright position and the first configuration, forward tilting (e.g., movement) would move the moving mass center of gravity $CG_{moving}$ less rearward of the head-neck pivot joint $P_{head-neck}$ to decrease the static mass moment arm $D_{static}$ and, thereby, decrease rearward torque (compare FIG. 2B to FIG. 2A; see also FIG. 2D). The forward tilting could eventually result in the first location of the moving mass $M_{moving}$ (e.g., of the moving mass center of gravity $CG_{moving}$) being forward of the head-neck pivot joint $P_{head-neck}$ to induce a forward torque with the moving mass $M_{moving}$.

The moving mass $M_{moving}$ is, however, movable so as to shift the moving mass center of gravity $CG_{moving}$ relative to the static mass center of gravity $CG_{static}$ and, thereby, shift the HMD center of gravity $CG_{moving}$ relative to the static mass $M_{static}$. More particularly, as the user tilts the head H forward from the upright position, the moving mass $M_{moving}$ is moved rearward relative to the static mass $M_{static}$, so as to shift the moving mass center of gravity $CG_{moving}$ rearward. In the example illustrated, the moving mass $M_{moving}$ is moved rearward such that the moving mass center of gravity $CG_{moving}$ is moved further rearward of the head-neck pivot joint $P_{head-neck}$ in the second configuration than the first configuration to, thereby, increase the static mass moment arm $D_{static}$ and increase rearward torque (compare FIG. 2C to FIG. 2A; see also FIG. 2D). This increase in rearward torque induced by the moving mass $M_{moving}$ may offset the increase in forward torque induced by the static mass $M_{static}$ when tilting the head H forward.

FIG. 2D graphically illustrates the beneficial effect of moving the moving mass $M_{moving}$ rearward relative to the static mass $M_{static}$ as the user tilts forward the head H and, thereby, the head-mounted display 100. Particularly, when moving the moving mass $M_{moving}$ rearward when tilting the head H forward, the HMD moment arm $D_{hmd}$ is shifted rearward markedly as compared the moving mass $M_{moving}$ being stationary. As a result, the forward torque induced by the head-mounted display 100 is comparatively reduced.

Table 1 (below) numerically illustrates the beneficial effect of moving the moving mass $M_{moving}$ (e.g., balancing mass 130) rearward relative to the static mass $M_{static}$ (e.g., the display unit 110) as the user tilts forward the head H and, thereby, the head-mounted display 100. Using the non-limiting example weights and centers of gravity described above, moving the moving mass $M_{moving}$ rearward by 2.5 inches from the static mass $M_{static}$ when tilting the head H forward by 15 degrees, the forward torque induced by the head-mounted display 100 is reduced by 2.5 inch-pounds as compared to the moving mass $M_{moving}$ being stationary (i.e., 2.8 inch-pounds vs. 5.3 inch pounds). Furthermore, even in the upright position, the forward torque induced by the head-mounted display 100 is reduced by 2.5 inch-pounds as compared there being no moving mass $M_{moving}$ (i.e., 2.0 inch-pounds vs. 4.5 inch-pounds).

TABLE 1

| Head Position | Moving Mass Configuration | Components | Weight (lbs.) | CG (inches from pivot) Horizontal | CG (inches from pivot) Vertical | Forward Torque (lb.-in) |
| --- | --- | --- | --- | --- | --- | --- |
| Upright | — | Head | 10 | 0.5 | 5.0 | 5.0 |
| | | Static Mass | 1.5 | 3.0 | 5.5 | 4.5 |
| | Original Position | Moving Mass | 1 | −2.5 | 5.5 | −2.5 |
| | | HMD | 2.5 | 0.8 | 5.5 | 2.0 |
| 15 Deg Forward Tilt | — | Head | 10 | 1.8 | 4.7 | 17.8 |
| | | Static Mass | 1.5 | 4.2 | 4.4 | 6.3 |
| | Original position | Moving Mass | 1 | −0.9 | 5.5 | −0.9 |
| | | HMD | 2.5 | 2.1 | 5.2 | 5.3 |
| | Moved −2.5 inches rel. to Static Mass | Moving Mass | 1 | −3.4 | 6.6 | −3.4 |
| | | HMD | 2.5 | 1.1 | 5.3 | 2.8 |

In the above example, the moving mass $M_{moving}$ is configured to partially offset the forward torque induced by the static mass $M_{static}$ in the upright position, the tilted position, and/or positions therebetween with the HMD center of gravity $CG_{hmd}$ remaining forward of the head-neck pivot point $P_{head-neck}$ (i.e., the HMD moment arm $D_{hmd}$ being greater than zero). As such, in the upright position, the tilted position, and/or positions therebetween, the head-mounted display 100 induces forward torque according to the following equation 1, where $D_{moving}$ is negative and $D_{static}$ is positive:

$$(W_{moving} \times D_{moving}) + (W_{static} \times D_{static}) > 0 \quad (1)$$

In other examples, the moving mass $M_{moving}$ may be configured to fully offset the forward torque induced by the static mass $M_{static}$ in the upright position, the tilted position, and/or positions therebetween with the HMD center of gravity $CG_{hmd}$ being centered about the head-neck pivot point $P_{head-neck}$ (i.e., the HMD moment arm $D_{hmd}$ being zero). As such, in the upright position, the tilted position, and/or positions therebetween, the head-mounted display 100 may induce negligible forward torque according to the following equation 2, where $D_{moving}$ is negative and $D_{static}$ is positive:

$$(W_{moving} \times D_{moving}) + (W_{static} \times D_{static}) = 0 \quad (2)$$

In a further example, the moving mass $M_{moving}$ may be configured to fully offset the forward torque induced by the static mass $M_{static}$ in the upright position, the tilted position, and/or positions therebetween and additionally offset a portion of the forward torque induced by the head H in the upright position, the tilted position, and/or positions therebetween. Particularly, the HMD center of gravity $CG_{hmd}$ is rearward of the head-neck pivot point $P_{head-neck}$ (i.e., the HMD moment arm $D_{hmd}$ being negative). As such, in the upright position, the tilted position, and/or positions therebetween, the head-mounted display 100 may induce rearward torque (i.e., negative forward torque) according to the following equation 3, where $D_{moving}$ is negative and $D_{static}$ is positive:

$$(W_{moving} \times D_{moving}) + (W_{static} \times D_{static}) < 0 \quad (3)$$

In the above examples, the moving mass $M_{moving}$ (e.g., the balancing masses 130) is contemplated as moving rearward relative to the static mass $M_{static}$ (e.g., the display unit 110) as the head H is tilted forward (e.g., in response thereto). Other movements of the moving mass $M_{moving}$ are contemplated. For example, the moving mass $M_{moving}$ may instead or additionally move forward relative to the static mass $M_{static}$ as the head H is tilted rearward to partially or fully offset the forward torque induced by static mass $M_{static}$. That is, whether tilting forward or rearward, the moving mass $M_{moving}$ may move to shift the HMD center of gravity $CG_{hmd}$ and may offset changes in torque (e.g., decreases) induced by the static mass $M_{static}$.

Further in the above example, the moving mass $M_{moving}$ (e.g., the balance mass 130) is arranged rearward of the head-neck pivot joint $P_{head-neck}$ when in the upright position. It is further contemplated that one or more of the balance masses 130 and/or the moving mass center of gravity $CG_{moving}$ may be arranged forward of the head-neck pivot joint $P_{head-neck}$ when in the upright position. For example, the balance mass 130 may be formed by a component of the display unit 110, the head support 120, or the electronics 140, such as a battery of the power device 746 coupled to the display unit 110) and be moved to offset any increases in forward torque that might otherwise occur with forward tilting of the head H.

Figure 3:
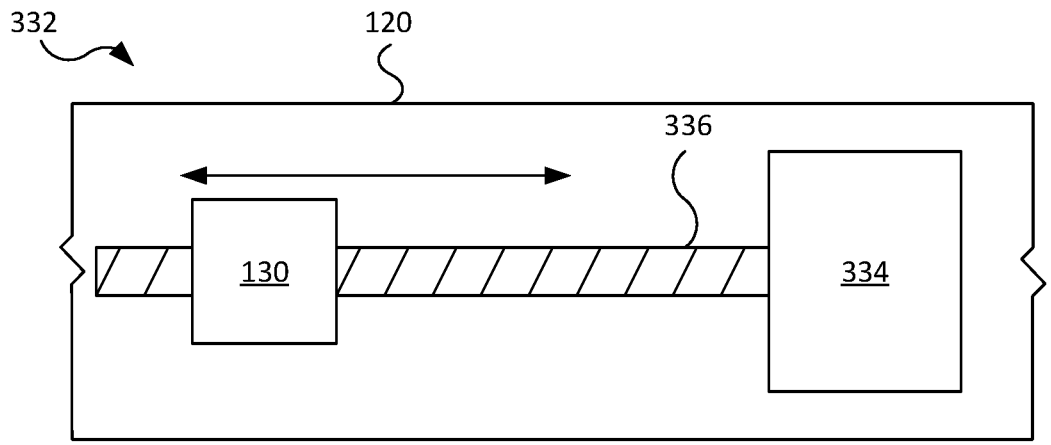
FIG. 3 is a side view of a first movement mechanism having a balancing mass of the head-mounted display of FIG. 1.
Figure 4:
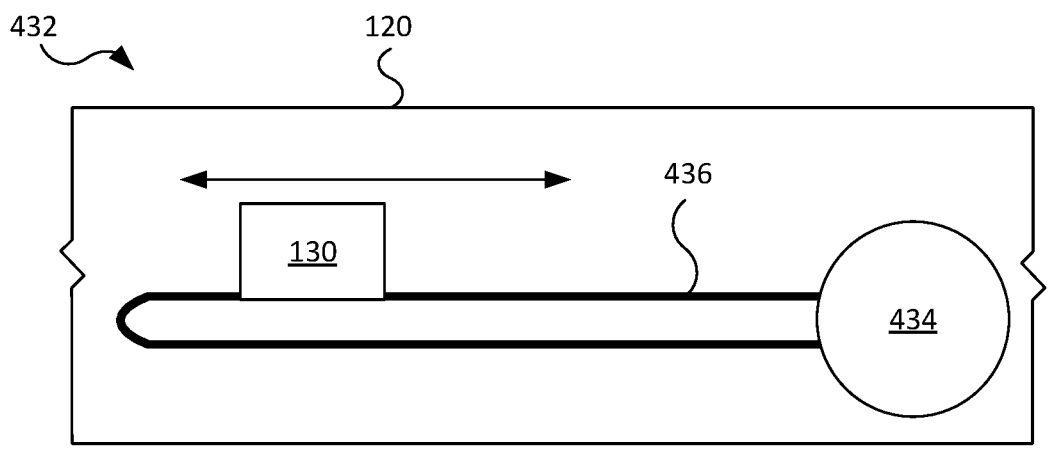
FIG. 4 is a side view of a second movement mechanism having the balancing mass.
Figure 5:
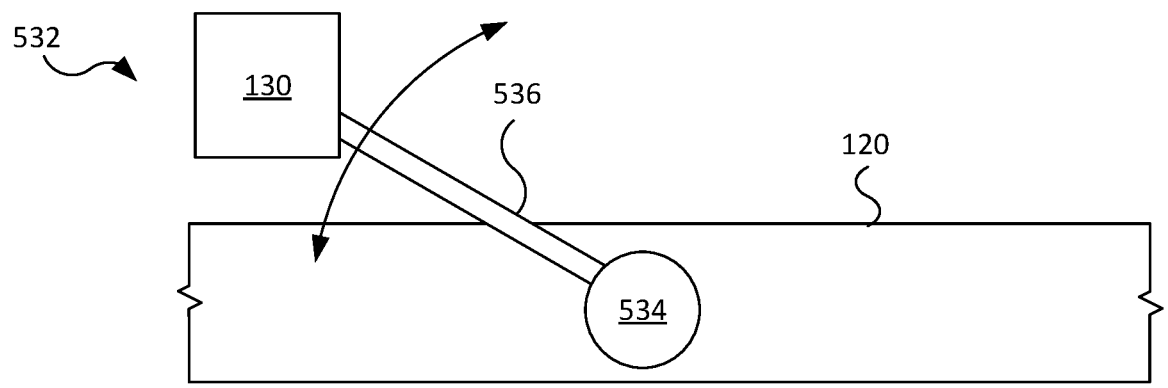
FIG. 5 is a side view of a third movement mechanism having the balancing mass.

Referring to FIGS. 3-5, the balancing mass 130, which forms the moving mass $M_{moving}$, is contemplated as being movable in different manners, for example, with different mechanisms or actuators, for example, being coupled to the balancing mass 130 and the head support 120. Those portions of the mechanisms that do not change position when operated may be considered part of the static mass $M_{static}$. For example, an electric motor may have a rotor that rotates in place and, therefore, is considered part of the static mass $M_{static}$.

As shown in FIG. 3, the balancing mass 130 may be movable by a lead screw mechanism 332 having a motor 334 and a lead screw 336 to which the balancing mass 130 is threadably coupled. As the motor 334 is operated (e.g., turned), the lead screw 336 rotates and the balancing mass 130 moves therealong. The lead screw mechanism 332 may, for example, be coupled to the head support 120. Alternatively, the actuator may include a motor that itself forms the balancing mass 130 (e.g., omitting the motor 334) and moves along the lead screw 336 relative to the display unit 110, for example, with the lead screw 336 in turn being coupled to the head support 120.

As shown in FIG. 4, the balancing mass 130 may be movable by a belt drive mechanism 432 having a motor 434 and a belt 436 coupled to the balancing mass 130 and operatively coupled to the motor 434 to be moved thereby (e.g., via toothed engagement). As the motor 434 is operated (e.g., turned), the belt 436 is pulled thereby to, in turn, pull the balancing mass 130 toward or away from the display unit 110. The balancing mass 130 may be guided in a path, for example, along a track. The belt drive mechanism 432 may, for example, be coupled to the head support 120.

As shown in FIG. 5, the balancing mass 130 is movable by a pivoting linkage mechanism 532 having a motor 534 and an arm 536 coupled to the balancing mass 130 and operatively coupled to the motor 534. As the motor 534 is operated, the arm 536 pivots relative to the display unit 110, so as to change position relative thereto. The arm 536 may be considered part of the moving mass. The pivoting linkage mechanism 532 may, for example, be coupled to the head support 120.

In still further examples, the balancing mass 130 may be moved in different manners, for example, with one or more of magnetic actuators (e.g., linear motor), hydraulic actuators (e.g., a pump that moves liquid as the balancing mass 130), or pneumatic actuators. Furthermore, while the balancing mass 130 may be formed as a generally rigid structure that is moved by a suitable mechanism, the balancing mass 130 may be cooperatively formed by discrete masses that move individually or cooperatively or a fluid (e.g., a water). For example, the moving mass may be cooperatively formed by multiple balancing masses 130 that are moved in conjunction with each other (e.g., ball bearings in a track). Still further, the balancing mass 130 may be a functional component of the head-mounted display 100 (e.g., having a function other than to simply offset torque), such as one of the electronic components 140 (e.g., a battery). In still further examples, the balancing mass 130 is moved passively, for example, by gravity acting thereon or a passive mechanism acting thereon (e.g., springs and/or linkages).

Figure 6:
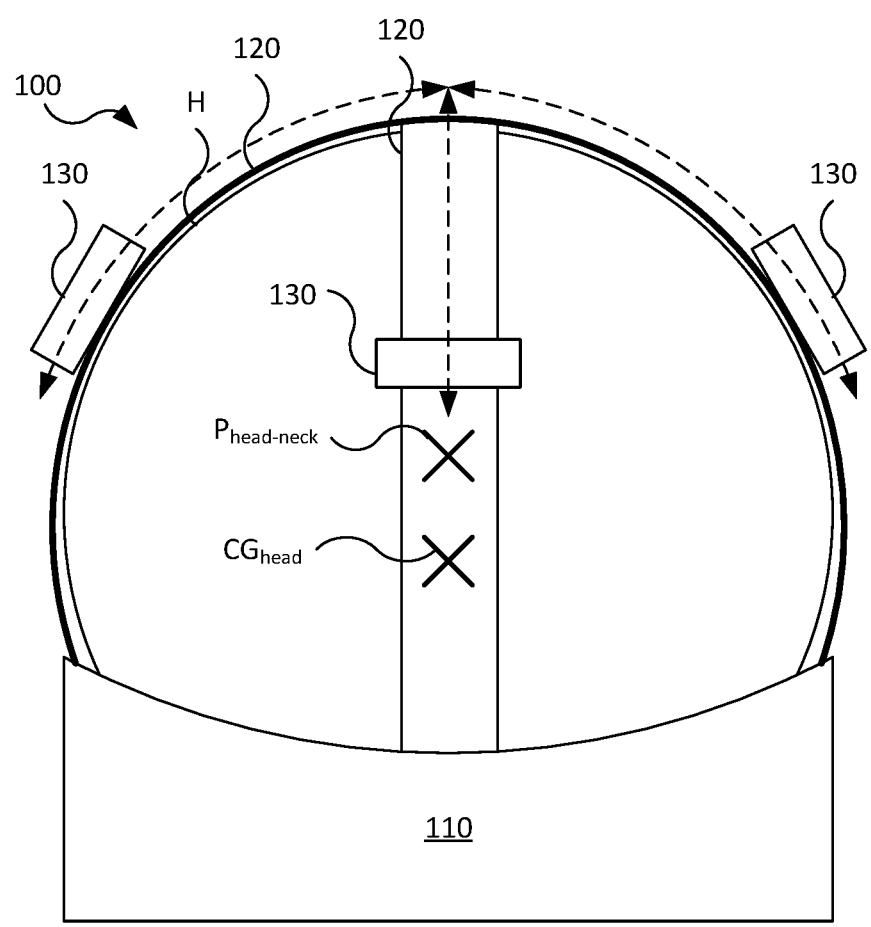
FIG. 6 is a top view of the head-mounted display of FIG. 1 on the head of the user.

Referring to FIG. 6, the head-mounted display 100 is configured to be balanced left-to-right, such as about a roll axis that may also be formed by the head-neck pivot joint mass Phead-neck. For example, the head-mounted display 100 may include two of the balancing masses 130 that form the moving mass $M_{moving}$, one on each of the left and right sides of the head-mounted display 100. The two balancing masses 130 may be moved in cooperation (e.g., in unison) with each other (e.g., being at generally equal fore-aft positions) to not induce or induce only a negligible left or right torque (e.g., a roll moment). Instead of or in addition to the left and right balancing masses 130, the head-mounted display 100 may include a balancing mass 130 located centrally that moves forward and rearward along a center of the head-mounted display 100.

As is generally illustrated in FIGS. 1-2C, 3, 4, and 6, the balancing mass 130 may move generally along the head support 120. In other embodiments, the balancing mass 130 is configured to move wholly or partially independent of the head support 120, for example, moving upward or rearward of the head support 120 (e.g., see FIG. 5).

Figure 7:
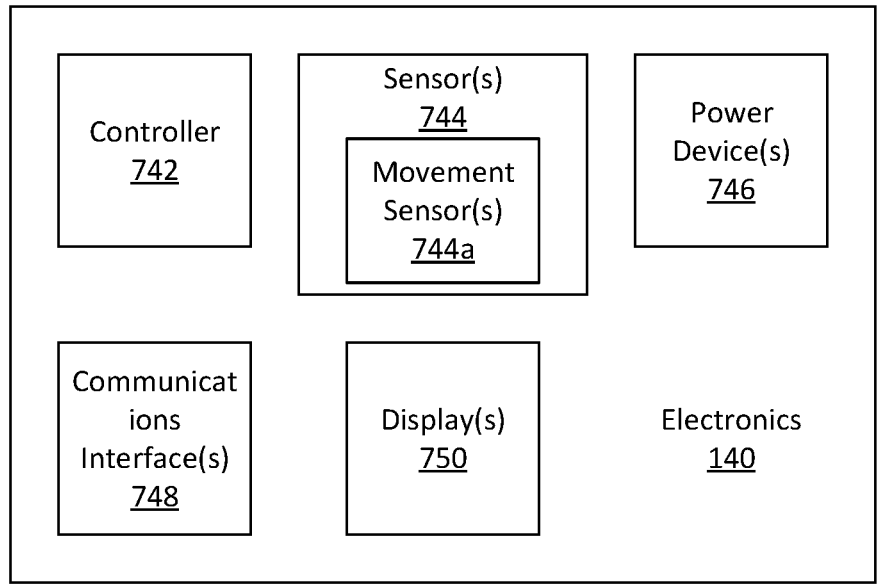
FIG. 7 is a schematic view of electronic components of the head-mounted display of FIG. 1.

Referring to FIG. 7, the head-mounted display 100 includes the electronics 140 referenced above. The electronics 140 may, for example, include a controller 742, one or more sensors 744, one or more power devices 746, one or more communications interfaces 748, and/or one or more displays 750. The controller 742 is a computing device configured to operate the head-mounted display 100, for example, to provide a computer-generated reality experience (discussed below) and to move the balancing mass 130. An example hardware configuration for the controller 742 is discussed below with reference to FIG. 8. The sensors 744 are configured to monitor various conditions, for example, of the head-mounted display 100 itself, the user, and/or the environment. The sensors 744, for example, include one or more movement sensors 744a (e.g., GPS, magnetometer, accelerometer, gyroscope, and/or inertial measurement unit (IMU)) according to which tilt of the head-mounted display 100 may be determined. Based on measurements of from the movement sensors 744a, the one or more balancing masses 130 may be moved in the manners described above to shift the HMD center of gravity $CG_{hmd}$ relative to static mass $M_{static}$ and offset the forward torque otherwise induced thereby. The power devices 746, such as one or more batteries, are configured to provide electrical power for operating the head-mounted display 100. It is contemplated that the power devices 746, such as one or more batteries, may form one or more of the balancing masses 130. The communications interfaces 748 are configured to send and/or receive signals to external devices in a wired or wireless manner, such as with other devices associated with the user (e.g., a smartphone or computer) or devices associated with others. The displays 750 are configured to display the graphical content to the use, such as graphical content associated with a computer-generated reality.

Figure 8:
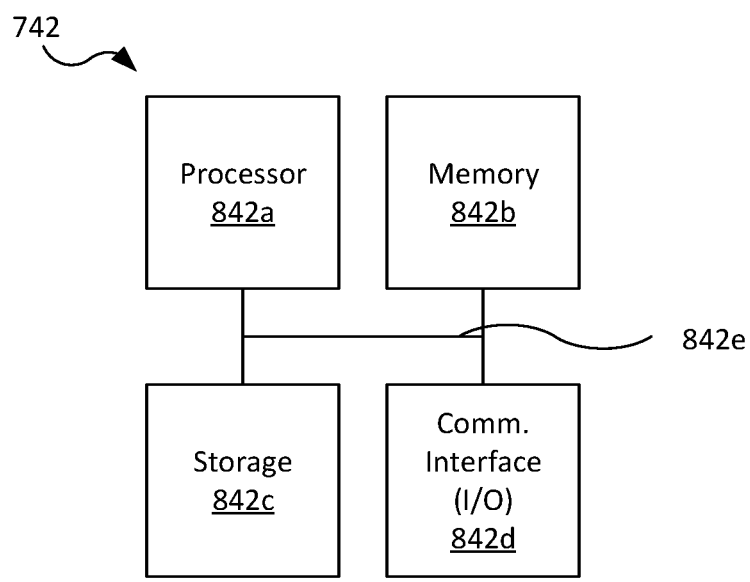
FIG. 8 is a schematic view of an example controller of the head-mounted display of FIG. 1.

Referring to FIG. 8, the controller 742 may be used to implement the apparatuses, systems, and methods described herein. For example, the controller 742 may receive sensor signals from one or more of the sensors 744, and output control signals to one or more actuators for moving the one or more balancing masses 130. An example hardware configuration of the controller 742 generally includes a processor 842a, a memory 842b, a storage 842c, a communications interface 842d (e.g., an input-output or I/O device), and a bus 842e facilitating communication therebetween. The processor 842a may be any suitable processing unit, such as a central processing unit (CPU), for executing computer program instructions and perform operations described thereby. The memory 842b may be a volatile memory, such as random-access memory (RAM). The storage 842c may be a non-volatile storage device, such as a hard disk drive (HDD) or solid-state drive (SSD). The storage 842c may form a computer readable medium that stores instructions (e.g., code) executed by the processor 842a for operating the head-mounted display 100, for example, in the manners described above and below. The communications interface 842d is in communication with other electronic components (e.g., the sensors 744, the communications interfaces 748, and/or the displays 750) for sending thereto and receiving therefrom various signals (e.g., control signals and sensor signals).

Figure 9:
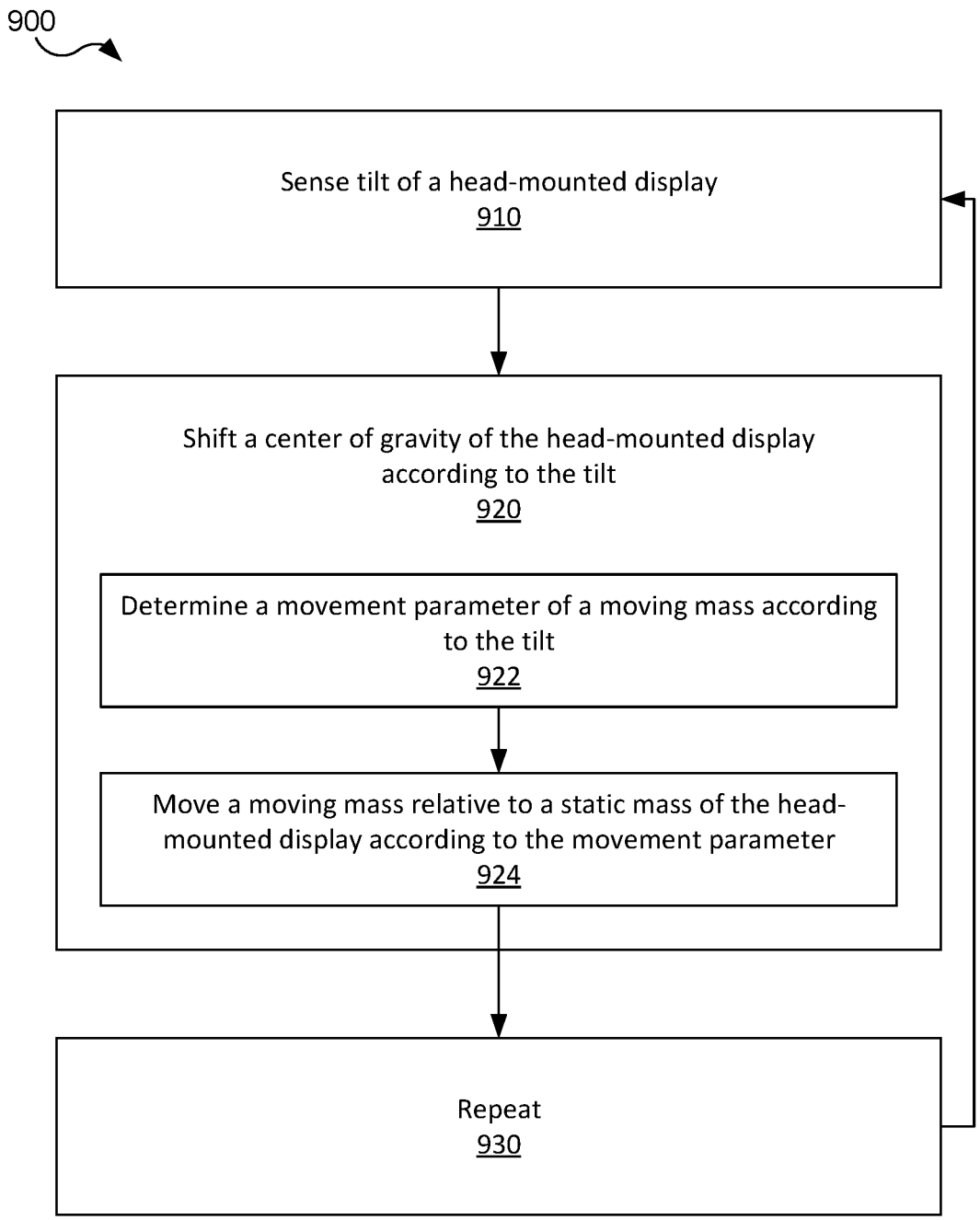
FIG. 9 is a flowchart of a method for operating a head-mounted display.

Referring to FIG. 9, a method 900 is provided for changing a center of gravity of a head-mounted display, such as the head-mounted display 100. The method 900 generally includes a first operation 910 of sensing tilt of a head-mounted display, a second operation 920 of shifting a center of gravity of the head-mounted display according to the tilt, and a third operation 930 of repeating the first operation 910 and the second operation 920. The second operation 920 may include a first suboperation 922 of determining a movement parameter of a moving mass according to the tilt, and a second suboperation 924 of moving the moving mass according to the movement parameter.

The first operation 910 of sensing tilt is performed with a sensor, such as the one or more movement sensors 744a described previously, in conjunction with a computing device, such as the controller 742. For example, the controller 742 receives sensor signals from the movement sensors 744a according to the condition observed thereby, such as a tilt angle of the head-mounted display 100. The controller 742 interprets the sensor signals from the sensors 744 and determines the tilt parameter thereof (e.g., a measured tilt angle or a tilt angle proxy value indicative of the tilt angle). The tilt sensed may be tilt of the head-mounted display 100 (e.g., of the display unit 110) and, thereby, indicate tilt of the head H of the user. The tilt sensed may be tilt in the forward and/or rearward directions.

The second operation 920 is performed with a moving mass, such as one of more of the balancing masses 130, as operated by the controller, such as the controller 742. For example, the controller 742 may, according to the tilt sensed in the first operation 910, move the balancing mass 130 to shift the HMD center of gravity $CG_{hmd}$ (e.g., relative to the display unit 110) to partially or fully offset torque induced by the static mass (e.g., the other components of the head-mounted display, such as the display unit 110 and/or the head support 120).

For example, in the first suboperation 922, a movement parameter may be determined for the one or more balancing masses 130. The movement parameter may, for example, be a movement distance, a target position, or a proxy thereto (e.g., an instruction for movement) of the balancing masses 130. The movement parameter is determined according to the tilt parameter determined in the first operation 910, for example, with a lookup table or one or more equations (e.g., accounting for the weight and the position or moment arm of the various components at a given tilt angle) to achieve the desired offsetting effect of the torque otherwise induced by the head-mounted display 100.

In the second suboperation 924, the one or more balancing masses are moved according to the movement parameter. For example, the controller 742 may send a control signal to the actuator associated with the balancing mass 130 (e.g., one of the motors) or directly control operation thereof, such that the one or more balancing masses 130 are moved according to the movement parameter.

In a third operation 930, the first operation 910 and second operation 920 may be repeated, so as to continually shift the HMD center of gravity $CG_{hmd}$ by moving the balancing mass 130 to offset the forward torque otherwise induced by the head-mounted display 100.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources to comfort of a head-mounted display. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to shift a center of gravity of a head-mounted display. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sensing head position, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, the center of gravity of the head-mounted display may be shifted independent of physical characteristics of the head of the user based on non-personal information data or a bare minimum amount of personal information, such as the content being requested by the device associated with a user, other non-personal information (e.g., generalized characteristics of a population of potential users), or publicly available information.

What is claimed is:

1. A head-mounted display, comprising:
   a display unit;
   a head support coupled to the display unit for supporting the display unit on a head of a user; and
   a screw mechanism configured to move a balancing mass relative to the display unit and along the head support to shift a center of gravity of the head-mounted display relative to the display unit.

2. The head-mounted display of claim 1, wherein the screw mechanism includes a motor and a screw, and the balancing mass is threadably coupled to the screw.

3. The head-mounted display of claim 2, wherein the screw mechanism is coupled to the head support.

4. The head-mounted display of claim 3, wherein the screw is configured to rotate during operation of the motor, and the balancing mass is configured to move along the screw as the screw rotates.

5. The head-mounted display of claim 1, wherein the screw mechanism includes a screw and a motor that forms the balancing mass, wherein the screw is configured to rotate during operation of the motor, and the motor is configured to move along the screw as the screw rotates.

6. The head-mounted display of claim 5, wherein the screw is coupled to the head support.

7. The head-mounted display of claim 1, wherein the balancing mass is located centrally relative to the head-mounted display and is configured to move forward and rearward along a center of the head-mounted display.

8. A head-mounted display, comprising:
   a display unit;
   a head support coupled to the display unit for supporting the display unit on a head of a user; and
   a belt drive mechanism configured to move a balancing mass relative to the display unit and along the head support to shift a center of gravity of the head-mounted display relative to the display unit.

9. The head-mounted display of claim 8, wherein the belt drive mechanism includes a motor and a belt, and the balancing mass is coupled to the belt via toothed engagement.

10. The head-mounted display of claim 9, wherein the belt drive mechanism is coupled to the head support.

11. The head-mounted display of claim 10, wherein the belt is configured to be pulled toward or away from the display unit during operation of the motor, and the balancing mass is configured to be pulled by the belt as the belt is pulled.

12. The head-mounted display of claim 11, wherein the balancing mass is guided in a path along a track.

13. The head-mounted display of claim 8, wherein the balancing mass is located centrally relative to the head-mounted display and is configured to move forward and rearward along a center of the head-mounted display.

14. The head-mounted display of claim 8, further comprising an additional balancing mass, wherein the balancing mass is on the left side of the head-mounted display and the additional balancing mass is on the right side of the head-mounted display, and the balancing mass and the additional balancing mass are configured to be moved in unison to induce a negligible roll moment.

15. A head-mounted display, comprising:
   a display unit;
   a head support coupled to the display unit for supporting the display unit on a head of a user; and
   a pivoting linkage configured to move a balancing mass relative to the display unit and relative to the head support to shift a center of gravity of the head-mounted display relative to the display unit, wherein the pivoting linkage includes a motor and an arm, wherein the arm is coupled to the balancing mass and is operatively coupled to the motor.

16. The head-mounted display of claim 15, wherein the arm is part of the balancing mass.

17. The head-mounted display of claim 15, wherein the pivoting linkage is coupled to the head support.

18. The head-mounted display of claim 15, wherein the arm is configured to pivot relative to the display unit during operation of the motor to change a position of the arm and the balancing mass relative to the motor.

19. The head-mounted display of claim 15, wherein the balancing mass is located centrally relative to the head-mounted display and is configured to move forward and rearward along a center of the head-mounted display.

20. The head-mounted display of claim 15, wherein the balancing mass is a functional component of the head-mounted display.

* * * * *